United States Patent

[11] 3,599,184

[72] Inventors Jeffry Hugh Beinart
Haddonfield;
Daniel Hampel, Westfield, both of, N.J.
[21] Appl. No. 840,761
[22] Filed July 10, 1969
[45] Patented Aug. 10, 1971
[73] Assignee RCA Corporation

[54] STORAGE CIRCUIT
3 Claims, 4 Drawing Figs.

[52] U.S. Cl. ........ 340/173 R, 307/203, 307/221, 340/173 FF
[51] Int. Cl. ........ G11c 11/40, G11c 19/00
[50] Field of Search ........ 307/203, 215, 221, 291, 292; 340/173

[56] References Cited

UNITED STATES PATENTS

| | | | |
|---|---|---|---|
| 3,145,342 | 8/1964 | Hill | 307/215 X |
| 3,264,567 | 8/1966 | Prieto | 307/215 X |
| 3,467,839 | 9/1969 | Miller | 307/215 X |

OTHER REFERENCES

IBM Technical Disclosure Bulletin, " CTRL Latch" by Flynn, Vol. 1, No. 6, 4/59 p- 20; 307- 215.

IBM Technical Disclosure Bulletin, " Minimal Sixteen Step Clock" by Brown, Vol. 5, No. 11, 3/63 page 52, 53; 307- 215

Maley et al.; " The Logic Design Of Transistor Digital Computers," Englewood Cliffs: Prentice-Hall, 1963, pages 259—260

*Primary Examiner*—Stanley M. Urynowicz, Jr.
*Attorney*—H. Christoffersen

ABSTRACT: A plurality of two-input logic gates such as OR gates supplying their outputs to a three-input logic gate such as an AND gate and including a feedback connection from the three-input gate to all but one of the two-input gates. A control signal is applied to the two-input gate not receiving feedback and the complement of this control signal is applied to one of the other two-input gates. An information signal is applied to the two-input gate not receiving feedback and to a two-input gate not receiving the complement of the control signal.

INVENTORS.
Jeffry H. Beinart and
Daniel Hampel.
BY Samuel Cohen
ATTORNEY

STORAGE CIRCUIT

The invention of the present application was made in the course of a contract with the Department of the Air Force.

BACKGROUND OF THE INVENTION

Storage circuits such as flip-flops are widely used in such digital circuits as registers, counters, memories and other computer circuits. The object of the present invention is to provide a new storage circuit which is relatively simple and inexpensive and which readily can be integrated.

SUMMARY OF THE INVENTION

A plurality of input logic gates applying their outputs to an output logic gate and all but one of which receive a feedback signal form the output logic gate. A control signal and its complement may be applied respectively to two of the input gates in such a way that for one value of the control signal, the circuit is insensitive to new information applied to the circuit and for another value of control signal, an information signal applied to a number of the input gates is gated into and stored in the circuit.

DETAILED DESCRIPTION

Figure 1:
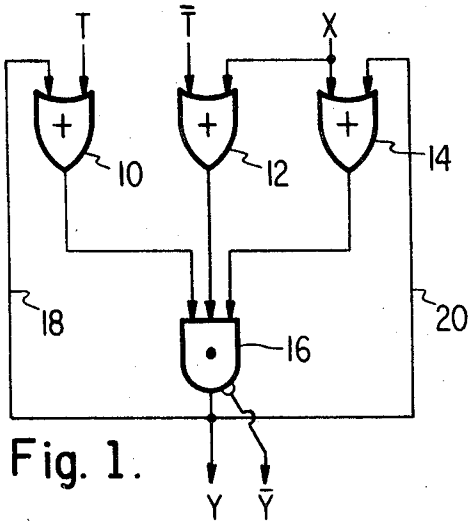
FIG. 1 is a block diagram of one embodiment of the present invention.

The circuit of FIG. 1 includes three OR gates 10, 12 and 14 and a logical product gate 16, known as an AND gate. The OR gates are connected at their output terminals to the three-input terminals to the AND gate 16. The AND gate is connected at its output terminal, via feedback lines 18 and 20, to the two OR gates 10 and 14, respectively. A control signal $T$ is applied to OR gate 10 and its complement $\overline{T}$ is applied to OR gate 12. An information signal $X$ is applied to OR gates 12 and 14. The AND gate 16 has a normal output $Y$ and also may have a complemented output $\overline{Y}$. For purposes of the present discussion, it may be assumed that a complemented signal $\overline{Y}$ is obtained by an inverter stage within AND gate 16.

In the operation of the circuit of FIG. 1, if $T$=0 and $\overline{T}$=1, the circuit continues to store the signal $Y$ and is insensitive to $X$. For example, if $Y$=0, since $T$=0 the output of OR gate 10 also is a 0 and this disables AND gate 16. Therefore AND gate 16 continues to produce an output $Y$=0, regardless of the value of $X$. If, under the same conditions, $Y$=0, then the output of OR gate 10 is 1, the output of OR gate 12 is 1 (since $\overline{T}$=1) and the output of OR gate 14 also is 1 (since $Y$=1). Thus, the three inputs to AND gate 16 all have the value 1 and regardless of the value of $X$, $Y$ continues to have a value representing a 1. Summarizing, when $T$=0 and $\overline{T}$=1, then $Y$=$Y$ regardless of the value of $X$.

To gate a signal into the storage circuit of FIG. 1, $T$ is made equal to 1 and $\overline{T}$ to 0. When $T$=1, OR gate 10 produces an output representing a 1 regardless of the value of $Y$. If now $X$=1, then OR gates 12 and 14 both produce an output representing a 1, regardless of the value $Y$. Therefore, when $T$=1 and $X$=1, the three inputs to AND gate 16 represent a 1 and $Y$ becomes equal to 1. In similar fashion, when $X$=0 then the output of OR gate 12 becomes 0 (as $\overline{T}$=0) regardless of the previous value of $Y$. The output representing 0 from OR gate 12 disables AND gate 16 and its output $Y$ becomes equal to 0 regardless of its previous value.

Figure 2:
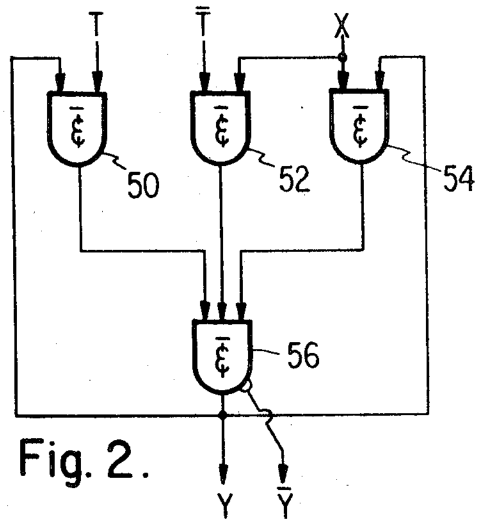
FIG. 2 is a block diagram of another embodiment of the present invention.

The embodiment of the invention shown in FIG. 2 is made up of all identical gates, namely NAND gates. A NAND gate implements the Boolean equation $C=\overline{AB}=\overline{A}+\overline{B}$.

In the circuit of FIG. 2, the three NAND gates 50, 52 and 54 are connected to the NAND gate 56. There is a feedback connection from the output of nand gate 56 to NAND gates 50 and 54, respectively. A control signal $T$ is applied to NAND gate 50 and its complement $\overline{T}$ is applied to NAND gate 52. The information signal $X$ is applied to NAND gates 52 and 54.

In operation, when $T$=1 and $\overline{T}$=0, the circuit is unaffected by the signal $X$. For example, if $Y$=0, then NAND gate 50 produces an output indicative of a 1 and NAND gate 54 produces an output indicative of 1. Similarly, since $\overline{T}$=0, NAND gate 52 produces an output indicative of a 1. Therefore, all three inputs to NAND gate 56 are 1 and it produces an output $Y$=0. If $Y$=1, then NAND gate 50 produces an output indicate of 0 since both $T$ and $Y$=1. Therefore, NAND gate 56 produces an output representing a 1 regardless of the value of $X$.

When $T$=0 and $\overline{T}$=1, then $X$, the information signal, is gated to the circuit. For example, if $X$=1 then as $\overline{T}$ is also equal to 1, NAND gate 52 produces a 0 output. This forces NAND gate 56 to produce an output $Y$=1. If $X$=0, then NAND gates 52 and 54 both produce outputs equal to 1. As $T$ also equals 0, NAND gate 50 also produces an output equal to 1. The three 1 inputs to NAND gate 56 cause to to produce an output equal to $Y$=0.

For the sake of completeness, NAND gate 56 is shown also to produce an output indicative of $\overline{Y}$. It will be clear to those skilled in the art that $\overline{Y}$ function produced by nand gate 56 is the AND function as $\overline{\overline{A}\overline{B}}=\overline{\overline{A}}+\overline{\overline{B}}=AB$. In similar fashion, in the circuit of FIG. 1, the $\overline{Y}$ produced by AND gate 16 is the NAND function. Thus, gates 56 and 16 may have the same structure.

Figure 3:
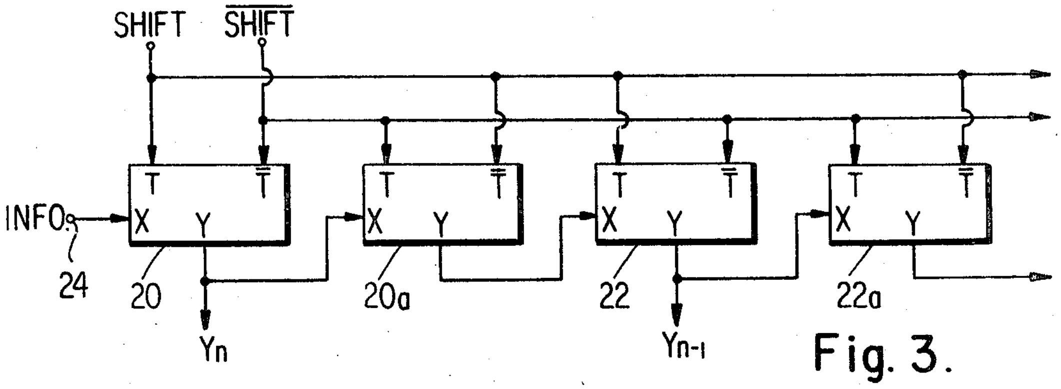
FIG. 3 is a block diagram of a shift register employing the circuit of FIG. 1 and FIG. 2.

The shift register of FIG. 3 illustrates one of the many uses for the circuits of FIGS. 1 and 2. Each stage consists of two circuits such as shown in FIG. 1 or 2. For example, the most significant stage consists of circuits 20 and **20*a*. The stage of next significance consists of circuits 22 and 22*a*** and so on. The shift line is connected to the *T terminal of the first circuit of each stage and the* $\overline{T}$ terminal of the second circuit of each stage. The $\overline{\text{shift}}$ line is connected to the $\overline{T}$ terminal of the first circuit of each stage and the $T$ terminal of the second circuit of each stage.

In the operation of the shift register of FIG. 3, assuming use of the FIG. 1 circuit, to start with shift=1 and $\overline{\text{shift}}$=0. (If the FIG. 2 circuit is used in the shift register, the starting condition is shift=0, $\overline{\text{shift}}$=1, but in other respects the operation is identical.) Under the set of conditions, the information signal present at terminal 24 is gated into the first circuit 20 in the manner already explained in connection with FIG. 1. The second circuit, **20*a*, whose information input terminal $X$ is connected to the output signal lead $Y$ of the first circuit 20** is insensitive to the value of $Y$.

The next half cycle, the values of shift and $\overline{\text{shift}}$ reverse, that is, shift becomes equal to 0 and $\overline{\text{shift}}$ to 1. Now, the first circuit 20 becomes insensitive to any new information signal which may be present at terminal 24 and the signal $Y_n$ stored in the first circuit 20 is gated into the second circuit **20*a*** of the first stage. This completes one shift cycle. During the first half of the cycle, new information if gated into the first circuit of the first stage and during the next half cycle, the first circuit if made insensitive to new information and the information stored in the first circuit is shifted into the second circuit.

By repeating the cycle above, information is shifted from stage to stage and new information is entered into the first stage in the same manner as discussed above. While only four circuits are shown in FIG. 3, these four circuits representing two stages of a shift register, it is to be understood, of course, that the shift register may have any length desired.

Figure 4:
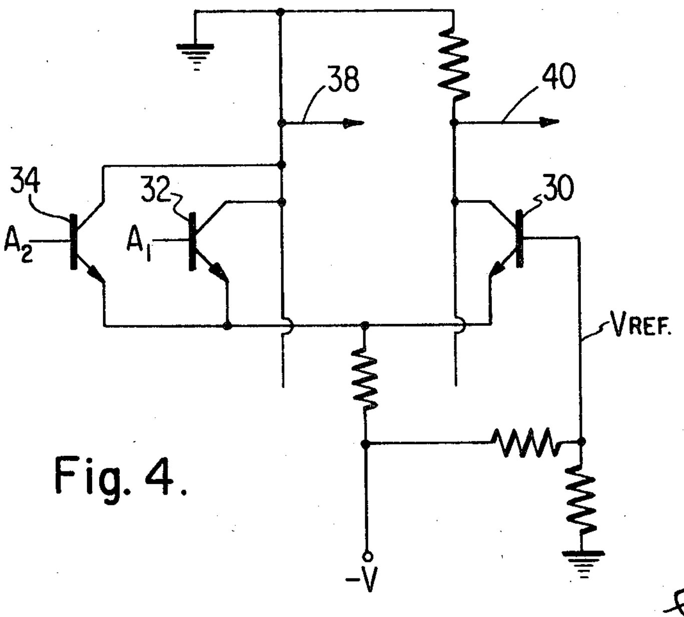
FIG. 4 is a schematic diagram to indicate how the circuit of FIG. 1 may be implemented.

A particularly attractive way of implementing the circuit of FIG. 1 makes use of a circuit based on a threshold logic gate described in R. O. Winder, "Threshold Logic Will Cut Costs Especially with Boost from LSI", *Electronics*, May 27, 1968, pages 94—103. The circuit shown on page 102 for example, may be modified in the manner shown in FIG. 4 to provide OR gate inputs. In the circuit shown on page 102, when a signal A represents a 1, current is steered through the transistor, corresponding to 32 of FIG. 4, into one path and when it represents a 0, current is steered through the other transistor, corresponding to transistor 30 in FIG. 4, to the other path. The modification required to implement the OR function for each input is shown in FIG. 4 of the present application. Each transistor such as 32 has in shunt with its emitter-to-collector path the emitter-to-collector path of a second similar transistor 34. Now, if either *A*1 (which in the present instance may be an input such as *X*) or *A*2 (which in the present instance may be an input such as $\overline{T}$) represents a 1, one of the transistors 32 and 34 will conduct and a current representing 1 will flow in the collector circuit of either *A*1 or *A*2.

FIG. 4 shows only one of the OR gates which is necessary in the present circuit. The complete circuit includes three sets of transistors such as 32, 34 and 30 providing three two-input OR gates for the circuit of the article. Thus, rather than inputs, A, B, C there are inputs $(A_1+A_2)$, $(B_1+B_2)$ and $(C_1+C_2)$. In addition, the threshold of the gate is set to the value of three in the use contemplated in the present invention. The remaining sets of input transistors (receiving inputs D...N) either are eliminated or the inputs D...N are all made to carry a constant bias representing binary 0.

The circuit of the article modified in the way shown in FIG. 4 is attractive for implementing the present invention as it readily may be integrated. MOreover, the circuit includes means for obtaining a normal output from the signal present at lead 40 and a complemented output from the signal present at lead 38 (across a resistor output is placed in its current path). Nevertheless, it is to be understood that this is merely one example as it is possible to implement the circuit in may other ways.

What we claim is:

1. A storage circuit comprising, in combination:

a three-input AND gate;

three two-input OR gates, each connected at its output terminal to a different input terminal to said three-input gate;

a feedback connection from the output terminal of said three-input gate to the first and second of said two-input gates;

means for applying a control signal to the first two-input gates and its complement to the third two-input gate; and means for applying an information signal to the second and third two-input gates.

2. A storage circuit as set forth in claim 1 wherein said three input AND gate has a second output terminal, this one for producing an output indicative of the NAND function.

3. A storage circuit comprising, in combination:

a three-input AND gate;

three two-input gates, each connected at its output terminal to a different input terminal to said AND gate; and a feedback connection from the output terminal of said AND gate solely to the first and second of said OR gates.